March 22, 1938. G. TODD Re. 20,675
CONVEYER DRIVING CONTROL
Original Filed May 20, 1935 . Sheets-Sheet 1
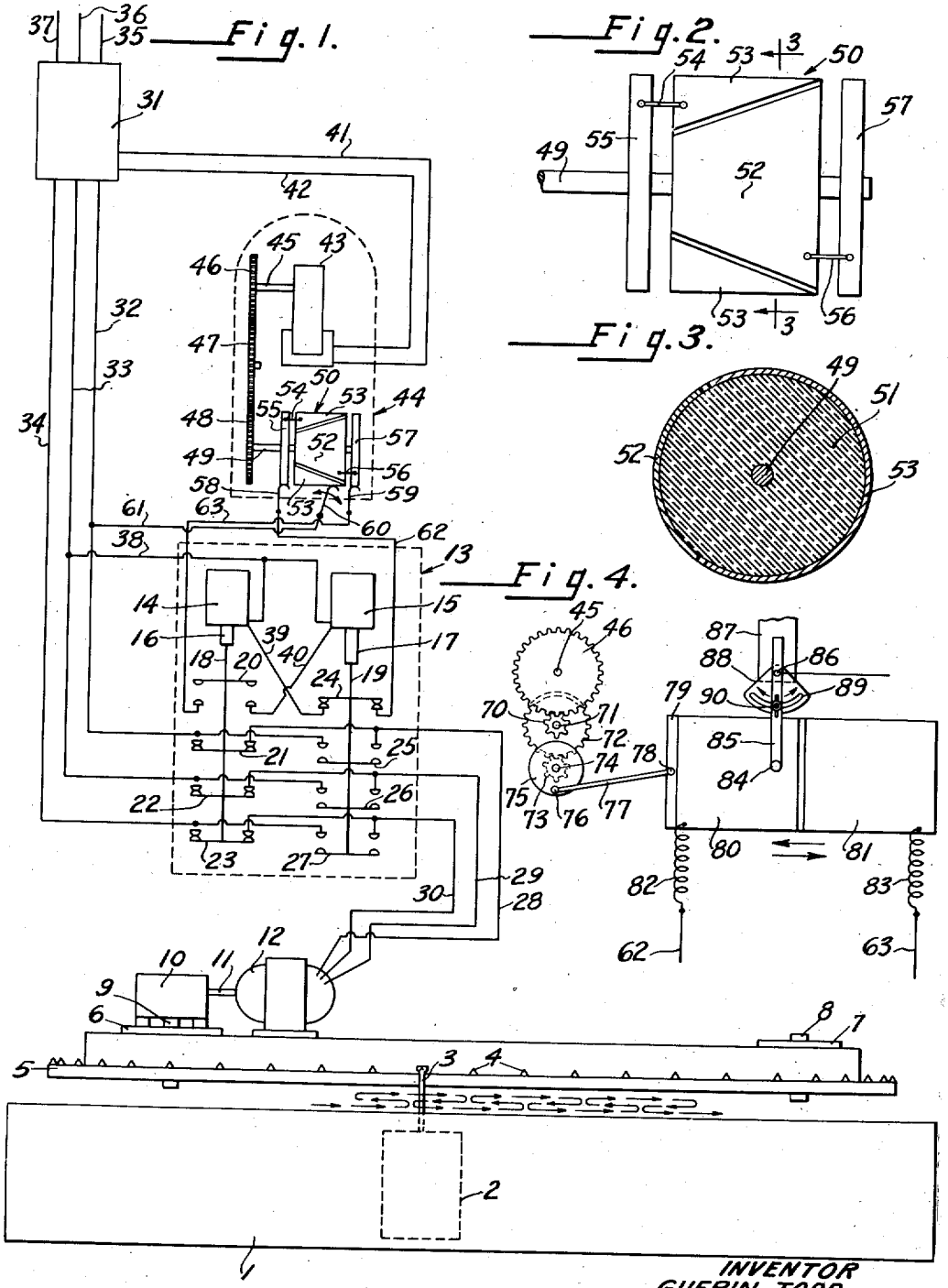
INVENTOR
GUERIN TODD.
BY Toulmin & Toulmin
ATTORNEYS March 22, 1938. G. TODD Re. 20,675
CONVEYER DRIVING CONTROL
Original Filed May 20, 1935 2 Sheets-Sheet 2
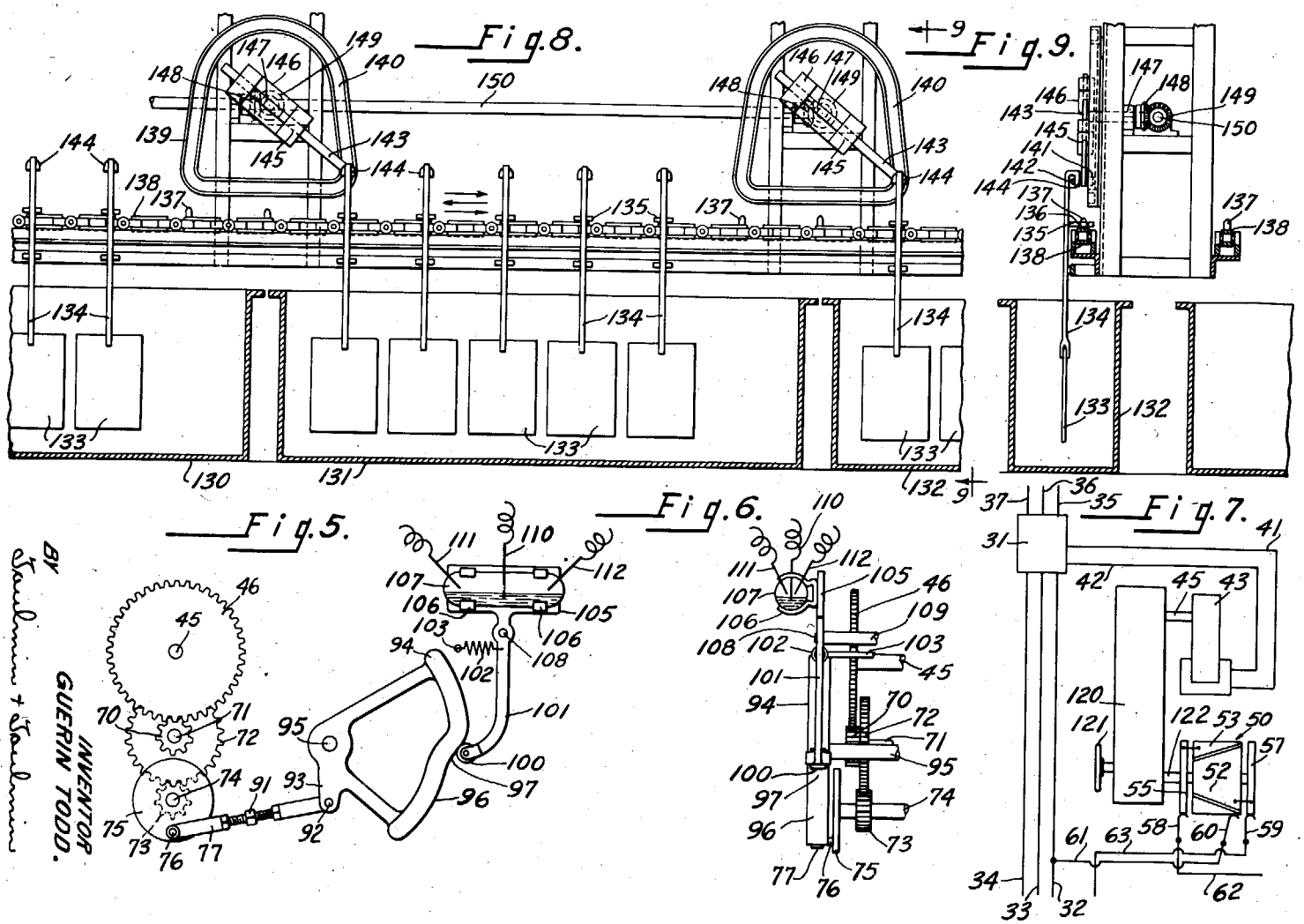
INVENTOR
GUERIN TODD.
BY
Faulmin + Faulmin
ATTORNEYS Reissued Mar. 22, 1938

Re. 20,675

UNITED STATES PATENT OFFICE 20,675

CONVEYER DRIVING CONTROL

Guerin Todd, Red Bank, N. J., assignor to Hanson-Van Winkle-Munning Company, Matawan, N. J., a corporation of New Jersey Original No. 2,074,599, dated March 23, 1937, Serial No. 22,329, May 20, 1935. Application for reissue July 15, 1937, Serial No. 153,832

9 Claims. (Cl. 204—5)

This invention relates to electro-plating apparatus, and in particular, to devices for causing the articles in such apparatus to be subjected to a reciprocating motion, together with a travel generally in one direction.

One object of this invention is to provide an electro-processing machine, wherein the work carrier is given a reversing motion so as to cause the work-pieces to move backward and forward within the solution.

Another object is to provide devices for providing such a forward and reverse motion to the workpiece, the motion in one direction being greater than that in the other so that the workpiece slowly travels through the solution in one general direction, while being moved to and fro in the solution.

Another object is to provide an electro-processing machine of the conveyer chain type, wherein the conveyer chain travels in an orbital path, the apparatus being provided with independently driven transfer devices for transferring the workpieces from one tank to another, the conveyer chain being provided with means for causing it to move forward and backward in unequal amounts.

Another object is to provide an electro-processing machine having an endless conveyer chain mounted to convey work-pieces through various solutions, the chain being driven by mechanism which imparts a reciprocating motion to the chain, together with a general motion in one direction, and transfer devices for transferring the work-pieces from one tank portion over the partition or wall thereof into another tank portion.

Another object is to provide an electrical timing device for operating an electro-processing machine of the above-described type, this electrical timing device having means for causing the driving motor of the apparatus to operate a greater length of time in one direction than in another, thereby providing a reciprocation of the conveyer chain driven thereby, together with a resultant motion in one direction.

Referring to the drawings:

Figure 1 is a diagrammatic view of a circuit and apparatus for imparting a reciprocating motion to work-pieces, together with a resultant motion in one direction, with single tank conveyer mechanism.

Figure 2 is an enlarged view of a portion of the timing device shown in Figure 1.

Figure 3 is a transverse section along the line 3—3 of Figure 2.

Figure 4 is a diagrammatic view of a modified form of timing device.

Figure 5 is a diagrammatic view of a modified form of timing device from that shown in Figures 1 and 4.

Figure 6 is an end elevation of Figure 5, looking toward the right-hand side thereof.

Figure 7 is a modified circuit similar to that shown in Figure 1, but having a variable speed reduction unit incorporated with the timing device.

Figure 8 is a longitudinal sectional view through an electro-processing machine with transfer conveyer mechanism, showing the work-pieces being conveyed through different tanks and transferred between tanks by transfer mechanism.

Figure 9 is a transverse section along the line 9—9 of Figure 8.

Hitherto, whether in the single tank conveyer type or transfer conveyer type of machine, the speed at which it was necessary to move the work through the various solutions was always less than the speed desirable for freeing the work from the gas bubbles which collect upon it during treatment. The time of treatment is fixed by the thickness of the deposit to be obtained, and the length of the treatment tank is fixed by the number of work-pieces that are to be treated in that time. The speed of the chain in feet per minute is thus the tank length in feet divided by the time in minutes. In commercial practice the chain speed is generally from one to three feet per minutes, wheeras a speed of not less than five feet per minutes would produce more satisfactory results, as it would wash off gas bubbles and particles of matter in the solution, as well as cause a rapid change of the solution in contact with the objects being plated.

Referring to the drawings in detail, Figure 1 shows a single tank conveyer type of machine with a circuit adapted to provide the reciprocating motion, together with the resultant motion in one direction, as created by the apparatus of this invention. In Figure 1 the electro-processing tank 1 is provided with a suitable liquid in which is immersed the work-piece 2 carried on the work carrier 3. The latter, in turn, is mounted upon the work-carrying pins 4 carried by the conveyer chain 5.

The conveyer chain 5 is arranged to move in an orbital path and is supported upon sprockets 6 and 7 at each end of the orbit. The sprocket 7 is supported as an idler upon the shaft 8, whereas the driving sprocket 6 is mounted upon the shaft 9. This receives power from the gear box 10, which in turn, receives power from the drive shaft 11 of the reversible motor 12. The motor is of the three-phase, reversible type, and is controlled, as to reversal, by a magnetic reverser, generally designated 13, and having the solenoidal operating coils 14 and 15, respectively. To these operating coils are connected the armatures 16 and 17, arranged to operate the switch rods 18 and 19. Mounted on the switch rod 18 are the contractor switch blades 20, 21, 22 and 23, whereas similarly mounted upon the switch rod 19 are the contractor switch blades 24, 25, 26 and 27.

The motor receives power from the magnetic reverser by way of the lines 28, 29 and 30, whereas the reverser receives power from a main switch box 31 by way of the lines 32, 33 and 34. The external power lines are indicated by the numerals 35, 36 and 37. A branch line 38 transmits current from the line 33 to one pole of the solenoidal windings 14 and 15, the opposite poles of which are cross-connected to the upper switch blades 20 and 24, respectively, by the lines 39 and 40.

From the main switch box 31 run the lines 41 and 42 to the synchronous timing motor 43 of the timing device, generally designated 44. The synchronous motor 43 on its shaft 45 carries a gear 46, which transmits power to a gear 48 by way of the idler gear 47 arranged there-between. The gear 48 is mounted upon the shaft 49 of the timer, generally designated 50. The timer 50, shown in enlarged view in Figure 2, consists of an insulating drum 51 mounted upon the shaft 49 and carrying on its periphery a pair of irregularly shaped segmental shells 52 and 53. The drum 51 is preferably of bakelite or some other similar material. The segment 53 is connected by the conductor 54 to the collector ring 55, whereas the segment 52 is similarly connected by the conductor 56 to the collector ring 57. The collector rings 55 and 57 are mounted in insulated relationship upon the drive shaft 49.

Referring again to Figure 1, the collector rings 55 and 57 of the timer 50 are engaged by brushes 58 and 59, respectively, whereas the central segments 52 and 53 are engaged by a brush 60. The brush 60, as shown by the double-headed rotor, is adjustable longitudinally along the timer. The brush 60 receives current from the power line 32 by way of the line 61, whereas the lines 62 and 63, respectively, convey current from the brushes 58 and 59 to the magnetic reverser 13.

In the operation of the apparatus shown in Figure 1, the synchronous motor 43 is operated to rotate the timer shaft 49 through the gear train 46, 47 and 48. The segments 52 and 53, of unequal peripheral extent, pass beneath the central brush 60 so that current is passed between the brush 60 and the collector rings 55 and 57 for unequal periods. Accordingly, when the brush 60 is in contact with the segment 53, as shown, the operating coil 14 is energized through the switch blade 24 carried by the switch rod 19, thereby energizing the motor 12 to drive the conveyer chain 5 in one direction.

As long as the timer rotates to bring the segment 52 under the central brush 60, the current passes from the latter to the collector ring 57, deenergizing the operating coil 14, dropping its switch rod 18 and energizing the operating coil 15 through the switch blade 20. This action causes current to be received reversely by the motor 12, reversing the direction of rotation thereof and accordingly reversing the direction of motion of the conveyer chain 5. It will be seen, however, that the peripheral extent of the segment 52 is much less than that of the segment 53, hence, the conveyer chain 5 will be operated a greater distance in one direction than in the other. Thus, the work-piece 2 will be given a reciprocating motion, having a greater extent in one direction than in the other, giving a reciprocation with a resultant motion in one direction.

By moving the central brush 60 relatively to the segments 52 and 53 in a longitudinal direction the proportionate period of engagement of the segment 53 compared with the segment 52 may be varied. By moving the brush 60 to the left (Figure 1) for example, the disparity of motion between the opposite directions is increased because the peripheral extent of the segment 53 is increased while that of the segment 52 is being decreased. By moving the brush 60 in a right-hand direction the opposite effect is obtained.

Instead of the timer, generally indicated by the reference numeral 50 (Figure 1), a modified form of timer, shown in Figure 4, may be employed. In this modified form the gear 46 on the synchronous motor shaft 45 drives a pinion 70 upon a shaft 71, which also carries the gear 72. The latter, in turn, meshes with the pinion 73 mounted upon the shaft 74. The latter carries the disc 75 with the crank pin 76 thereon. On the crank pin 76 is pivotally mounted the connecting rod 77, the opposite end of which is pivotally connected, as at 78, to a reciprocating member 79. On the reciprocating member 79 is mounted a pair of plates 80 and 81, insulated from one another, the member 79 being preferably of insulating material. The plate 80 is provided with an electrical conductor 82 to convey current therefrom, whereas the plate 81 has a similar electrical conductor 83. These two electrical conductors are in "pigtail" form to enable a flexible connection during the reciprocation of the plates.

Arranged to engage the plates is a brush 84 mounted on the arm 85, pivoted as at 86, to a support 87. The support 87 carries a quadrant 88 having an arcuate slot 89 therein. The arm 85 is provided with a clamp screw 90, engaging the arcuate slot 89 and serving to clamp the arm 85 in any desired position around its pivot 86. By suitably adjusting the arm 85 the position of the brush 84 relative to the plates 80 and 81 may be varied.

When the shaft 45 of the synchronous motor 43 is rotated the connecting rod 77 obviously reciprocates, likewise causing a reciprocation of the reciprocating member 79. Under these conditions the brush 84 alternately engages plates 80 and 81 for different periods of time. Current is supplied to the brush 84 through the line 61 and passes outward either through the conductor 82 or the conductor 83 for different periods of time, as determined by the angular adjustment of the arm 85 upon the quadrant 88.

The apparatus shown in Figure 4 is electrically connected in a manner similar to that of the arrangement shown in Figure 1, and produces a similar effect upon the reciprocation of the conveyer chain 5 by operating the motor 12 in a reversing cycle through different periods of time.

The modified form of timing device shown in Figure 5 is driven through a train of gears and a connecting rod, generally designated 77, in a manner similar to that of Figure 4, described above. The connecting rod 77 is provided with an adjustment 91, whereby the effective length of the connecting rod 77 may be adjusted between the axis of the crank pin 76 and the pivot pin 92, where it is connected to the arm 93 of a cam 94.

The cam 94 is pivotally mounted, as at 95, and has on its periphery a cam surface 96, of a configuration suitable for the switch-shifting purpose described below.

Arranged to engage the cam surface 96 is a follower 100 (Figure 5) mounted upon an arm 101 urged thereagainst by the spring 102 having an anchorage 103. The arm 101 is attached to a plate 105 having clips 106 for holding a mercury switch tube 107. The plate 105 is pivotally mounted, as at 108, upon a support 109. The mercury switch 107 is provided with a central pole 110 and end poles 111 and 112, respectively.

In the operation of the modified construction shown in Figures 5 and 6 the cam 94 will be oscillated to and fro by the connecting rod 77, and the mercury switch 107 will be tilted first in one direction and then in the opposite direction as the follower 100 is engaged by the different portions of the cam surface 96. Under these conditions the switch 107 may be connected to the same lines as the timing device shown in Figure 1, and employed to operate the magnetic reverser 13 in a similar manner. It will be observed that by turning the adjustment 91 the relative movement of the cam surface 96 on either side of its neutral point 97 may be adjusted by varying the setting of the adjustment 91, thereby causing the switch tube 107 to be tilted longer in one position than in the other. This, in turn, causes the motor 12 to be operated a longer period of time in one direction than in the other.

The modified form of timing device shown in Figure 7 is similar to that shown in Figure 1 and like numerals denote similar parts. In the Figure 7 construction, however, the gear train is replaced by a variable speed reduction unit 120, having an adjusting wheel 121. This variable speed reduction unit is of a conventional type, the details of which form no part of the present invention. By adjusting the wheel 121 the speed obtained from the shaft 122 thereof and applied to the timing device may be varied so that the ultimate speed of travel of the conveyer chain may be varied as well as the proportionate travel in its opposite direction of travel.

The electro-processing apparatus shown in Figures 8 and 9 illustrates the application of the timing device of this invention to the transfer conveyer type of machine. This machine consists of an arrangement having a series of different tanks with transfer mechanism for raising the work-pieces over the partitions between tanks. In such apparatus there is ordinarily an empty space left when a work-piece is raised over the partition from one tank to the next tank, because the transfer mechanism ordinarily works at a more rapid rate than the conveyer chain. By the use of the timing device of this invention to reciprocate the conveyer chain, however, this waste space may be utilized for the motion of the work-pieces. In this manner the effective length of the tank may be increased and the speed of motion of the work-pieces also increased thereby increasing the elimination of the gas bubbles which otherwise collect upon the work-pieces.

In the arrangement shown in Figures 8 and 9 the work-pieces, by the reciprocation, can be given an effectively high speed for eliminating the gas bubbles, and at the same time the resultant onward travel of the work-piece is sufficiently small to accommodate it to the mechanical limitations of the apparatus.

The length of the conveyer for an electro-processing machine is ordinarily determined by the number of pieces to be processed and the time required to obtain the desired thickness of plated coating. To this end the apparatus in Figures 8 and 9 consists of a plurality of tanks 130, 131 and 132 arranged in an orbital path, and having work-pieces 133 immersed in the liquid therein. The work-pieces 133 are suspended from work carriers 134 having arms 135 with apertures 136 adapted to slip over pins 137, spaced at intervals along the endless conveyer chain 138. The latter moves in an orbital path in a manner similar to that previously described in connection with Figure 1.

The transfer mechanism arranged adjacent each partition between tanks consists of an orbital guide frame 139, having a guideway 140 in which moves the follower 141 on a pin 142 in the end of a rod 143. The upper ends of the work holders 134 are provided with downwardly opening yoked portions or sockets 144 adapted to be engaged by the outer end of the pin 142. The rod 143 is mounted for reciprocation in the guideways 145 of the cradle 146, the latter being attached to the transverse shaft 147 having the bevel gear 148 driven by the bevel gear 149 on the longitudinal shaft 150.

The longitudinal shaft 150 is driven independently of the conveyer chain 138 but in timed relationship therewith so that the rod 143 will arrive at the proper position for engaging the socketed portion 144 of the work carrier 134 when the latter arrives opposite the left-hand lower corner of the guide frame 139. The rod 143 simultaneously reciprocates and sweeps through an angular path in a clockwise direction, while its follower 141 moves around the orbital path formed by the guideway 140.

The conveyer chain 138 is reciprocated in alternate forward and reverse directions of unequal extent, in the manner previously described in connection with Figure 1, so that the work holders 134 with their work-pieces 133 are enabled to move to and fro through the entire space within the tank 130, 131 or 132. The chain 138 thus moves forward, backward and forward again between each operation of the transfer mechanism so that the spaces otherwise empty at the ends of the tanks are fully utilized.

It will be understood that it is desired to comprehend within this invention such modifications as come within the scope of the claims and the invention.

It will be further understood that in place of the reversible motor, reversing devices may be used for reversing the direction of power from a non-reversible motor to the conveyer chain, these devices being operated by the timing devices of the present invention.

It will be further understood that in place of the arcuate adjustment of the arm 85, in Figure 4, a linear adjustment may be provided to vary the position of the brush 84.

Having thus fully described my invention, what is claimed as new and desired to be secured by Letters Patent, is:

1. In an electro-processing machine, an endless work-conveying chain having means associated therewith for supporting work-pieces, a tank arranged to receive said work-pieces, a motor for driving said chain, a reverser for reversing the direction of motion of said chain, electrical means for operating said reverser, a current distributor connected to said reverser and having a plurality of conductors insulated from one another, a contact member arranged to engage said conductors, and means for moving said conductors and said contact member into alternate engagement with one another whereby to move said chain alternately in opposite directions.

2. In an electro-processing machine, an endless work-conveying chain having means associated therewith for supporting work-pieces, a tank arranged to receive said work-pieces, a motor for driving said chain, a reverser for reversing the direction of motion of said chain, electrical means for operating said reverser, a current distributor connected to said reverser and having a plurality of conductors insulated from one another, a contact member arranged to engage said conductors, and means for moving said conductors and said contact member into alternate engagement with one another for different proportionate periods of time is each cycle of motion whereby to move said chain to and fro alternately in opposite directions but with a resultant progressive motion in a single direction.

3. In an electro-processing machine, an endless work-conveying chain having means associated therewith for supporting work-pieces, a tank arranged to receive said work-pieces, a motor for driving said chain, a reverser for reversing the direction of motion of said chain, electrical means for operating said reverser, a current distributor connected to said reverser, a synchronous motor for operating said current distributor, said current distributor having a plurality of conductors insulated from one another, a contact member arranged to engage said conductors, and means for moving said conductors and said contact member into alternate engagement with one another whereby to operate said chain alternately in opposite directions.

4. In an electro-processing machine, an endless work-conveying chain having means associated therewith for supporting work-pieces, a tank arranged to receive said work-pieces, a motor for driving said chain, a reverser for reversing the direction of motion of said chain, electrical means for operating said reverser, a timing drum having segments of unequal peripheral extent electrically connected to said reverser, an electrical contact member arranged to engage said segments, and means for rotating said timing drum whereby to bring said segments alternately into engagement with said contact member.

5. In an electro-processing machine, an endless work-conveying chain having means associated therewith for supporting work-pieces, a tank arranged to receive said work-pieces, a motor for driving said chain, a reverser for reversing the direction of motion of said chain, electrical means for operating said reverser, a timing drum having segments of unequal peripheral extent electrically connected to said reverser, an electrical contact member arranged to engage said segments, and means for rotating said timing drum to bring said segments alternately into engagement with said contact member, said timing drum and said electrical contact member being adjustable axially with respect to one another whereby to vary the proportionate periods of contact of said segments with said electrical contact member.

6. In an electro-processing machine, an endless work-carrying chain having means associated therewith for supporting work-pieces, a tank arranged to receive said work-pieces, a motor for driving said chain, a reverser for reversing the direction of motion of said chain, electrical means including a circuit for operating said reverser, a double-throw switch in said circuit and arranged to control the actuation of said electrical means, mechanism to close said switch alternately in its two positions, and means to adjust said switch-closing mechanism whereby to vary the relative period of closure in each position.

7. In an electro-processing machine, an endless work-conveying chain, a motor for driving said chain, a reverser for reversing the direction of motion of said chain, electrical means for operating said reverser for different distances of alternate reciprocation, a plurality of tank portions arranged along the path of said chain, work-transfer devices at the partitions between said tanks, and means for driving said work-transfer devices independently of said alternately reciprocable chain but in timed relationship therewith.

8. In an electro-processing machine, an endless work-conveying chain, a motor for driving said chain, a reverser for reversing the direction of motion of said chain, electrical means for operating said reverser for different distances of alternate reciprocation, a plurality of tank portions arranged along the path of said chain, work-transfer devices at the partitions between said tanks, and means for driving said work-transfer devices independently of said alternately reciprocable chain but in timed relationship therewith, said work-transfer devices being arranged to engage the work-pieces conveyed by said chain when said work-pieces arrive at the partition between successive tanks.

9. In an electro-processing machine, an endless work-conveying chain, a motor for driving said chain, a reverser for reversing the direction of motion of said chain, electrical means for operating said reverser for different distances of alternate reciprocation, a plurality of tank portions arranged along the path of said chain, work-transfer devices at the partitions between said tanks, and means for driving said work-transfer devices independently of said alternately reciprocable chain but in timed relationship therewith, said work-transfer devices being arranged to operate at a higher speed than said work-conveying chain.

GUERIN TODD.